Patented Mar. 21, 1950

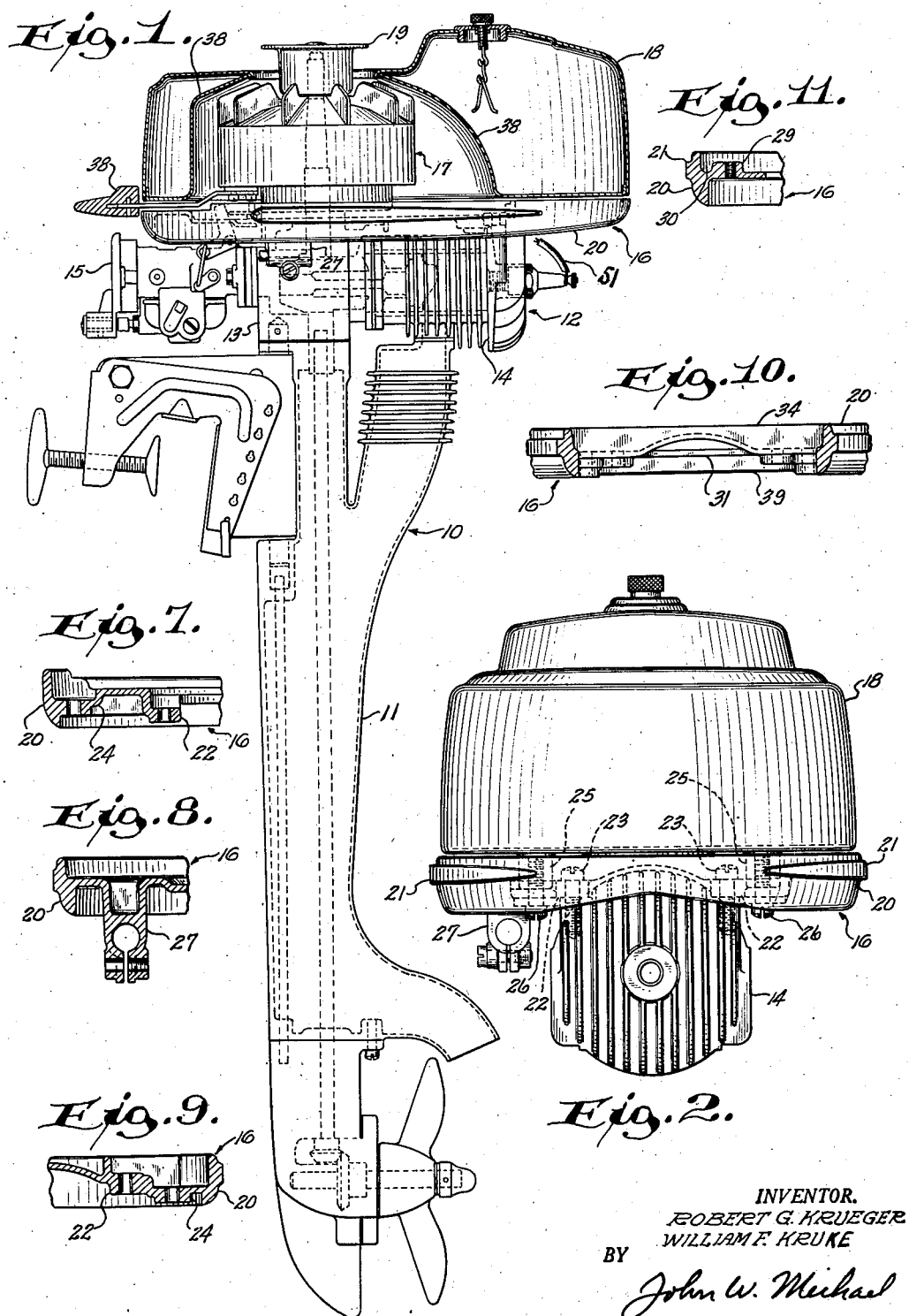

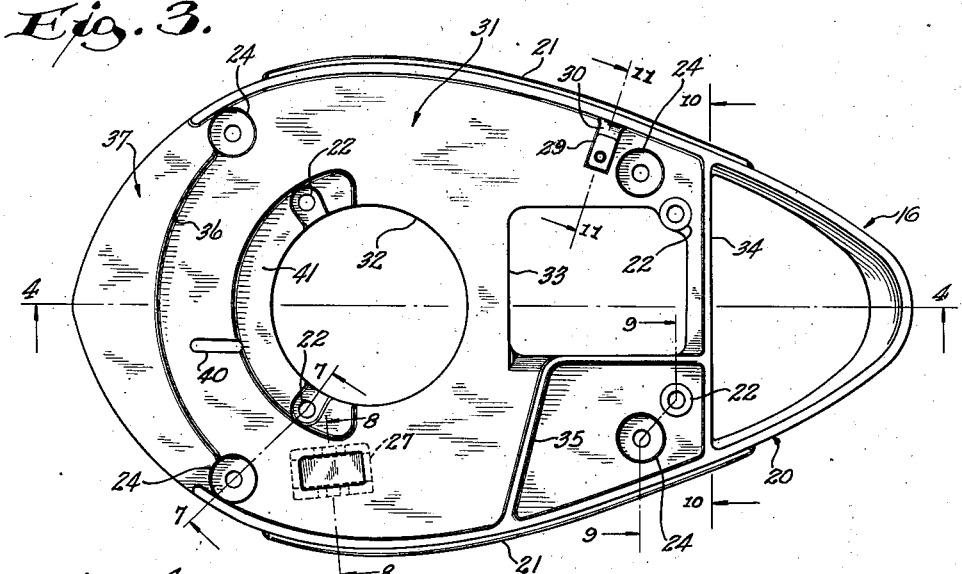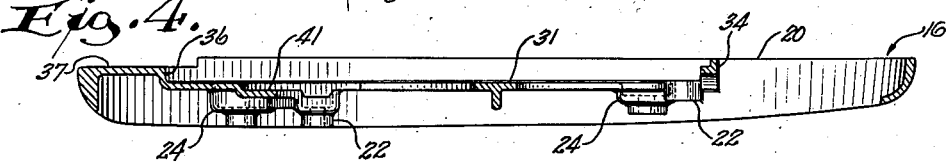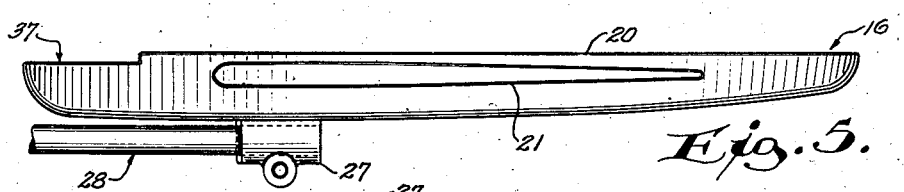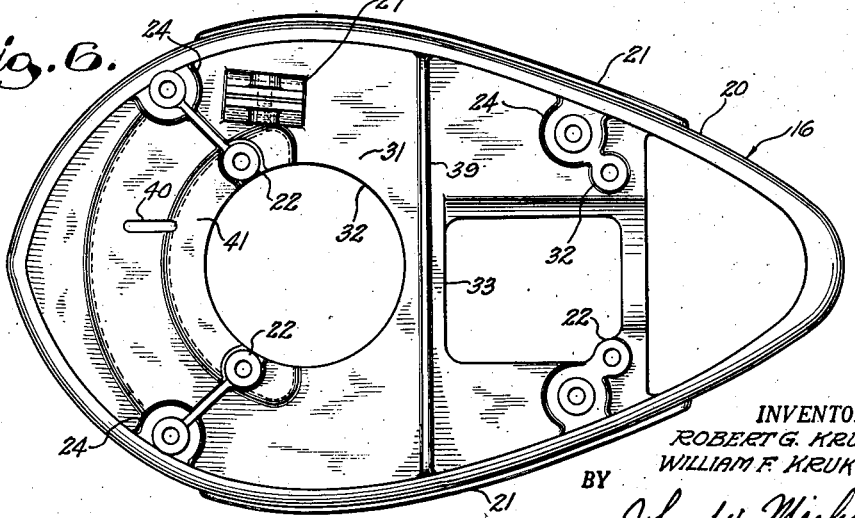

2,501,470

UNITED STATES PATENT OFFICE 2,501,470

OUTBOARD MOTOR TANK, ENGINE, AND SUPPORT ASSEMBLY

Robert G. Krueger, Milwaukee, and William F. Kruke, Hartford, Wis., assignors to West Bend Aluminum Company, Hartford, Wis., a corporation of Wisconsin Application January 12, 1946, Serial No. 640,768

8 Claims. (Cl. 115—17)

This invention relates to improvements in outboard motors and has particular reference to the support for the gasoline tank and to the manner of supporting an outboard motor in an inclined position and providing protection for the gasoline tank and the engine.

Outboard motors are usually stored or transported in a reclining position in which the lower end of the under-water leg and some portion of the tank or engine each contact the floor or ground. While being transported or stored in this position, damage often occurs to the gasoline tank, the engine, or its accessories.

It is an object of this invention, therefore, to provide a support for an outboard motor which holds it in an inclined position and also protects the gasoline tank from damage.

A further object of the invention is to provide a support for the gasoline tank which also provides a clamping source to which a steering lever may be secured.

Another object is to provide a support for the gasoline tank which also provides a support for the electrical conduit used in the ignition system of the motor.

A still further object of the invention is to provide a support for the gasoline tank and also cooperates therewith to form a fan housing and a passage for the cooling air directed on the cylinder.

These objects are obtained by providing a frame having a peripheral flange the outline of which is similar to that of the gasoline tank. Such flange is positioned immediately below and spaced from the tank and projects laterally beyond all sides of the tank. The flange thus forms a supporting surface on all sides of the tank which keeps the tank and engine elevated from and out of contact with the surface on which the outboard motor is carried in an inclined position. To hold the flange rigidly in this position, the frame has portions interior of the flange which rest upon and are secured to the crank case and cylinder. Other portions also interior of the flange hold the tank rigidly in position relative to the flange. The frame is also provided with a steering lever clamp which projects below the bottom edge of the flange and holds the steering lever projecting laterally from the frame. Turning force applied to the lever is transmitted by the frame to the engine. The frame is also provided with a portion adapted to position and hold the conduit which connects the spark plug to the ignition system, thus keeping such conduit within the protective confines of the flange.

In the case of air-cooled motors the gasoline tank surrounds the flywheel and its fan to form a fan housing. In such case the frame is provided with a web which forms the bottom of such housing. Such web has an opening to receive the drive shaft and a portion of the crank case and also an air outlet over the cylinder. A ridge projecting upwardly from the edge of said outlet cooperates with the tank bottom to direct the air downwardly through said outlet onto the cylinder and cylinder head.

Even though the peripheral flange be removed the frame still functions to support the tank, to provide a clamp for the steering lever, to hold the conduit and/or to form a part of the cooling air cowl and passageway.

Referring to the accompanying drawings forming a part hereof, Figure 1 is a view in side elevation of an outboard motor provided with a support embodying the invention, the gasoline tank and control lever being shown in section for the sake of clarity;

Figure 2 is a fragmentary enlarged view in stern elevation showing the cylinder head, the flange of the supporting frame and the gasoline tank;

Figure 3 is an enlarged top plan view of the supporting frame and protecting flange;

Figure 4 is a sectional view taken on the line 4—4 of Figure 3;

Figure 5 is an enlarged port side elevation of the supporting frame and protecting flange;

Figure 6 is an enlarged bottom plan view of the supporting frame and protecting flange;

Figures 7, 8, 9, 10 and 11 are fragmentary section views taken on the lines 7—7, 8—8, 9—9, 10—10 and 11—11, respectively, of Figure 3;

Referring in greater detail to the drawings, the outboard motor is indicated generally at 10 and comprises a supporting leg 11 to the upper end of which is secured to engine 12. The engine comprises a crank case 13, a cylinder 14, a carburetor 15, and combined flywheel and magneto and fan 17. In the embodiment described the engine is air cooled; however, the supporting frame and protecting flange can be used with equal advantage with water cooled engines.

The frame designated generally at 16 is mounted on the engine 12 prior to the installation of the flywheel, magneto, and fan combination 17. After the frame has been installed, the combined flywheel, magneto and fan is added. Thereafter the gasoline tank 18 is placed over on the frame 16 and the starting spool 19 added. The tank 18 has an interior opening encircling the fan to form a fan housing or cowl.

Proceeding now to a more detailed description of the frame 16, it has a peripheral flange 20 the outline of which is shaped substantially like that of the gasoline tank. As indicated, this is a general streamlined shape, being broader near the bow and tapering toward the stern. However, other shapes may be practical. The essential characteristic is to have substantial conformity between the outline shape of the flange 20 and of the tank 18. The flange 20 is positioned immediately beneath the bottom of the tank 18. As is clearly shown in Figure 2, the peripheral outline of the flange 20 projects laterally in all directions beyond the peripheral outline of all sides of the tank 18. The outer surface of flange 20 is sufficiently broad to provide a substantial contacting surface for ground or floor. It will be seen, therefore, that the flange 20 will engage a supporting surface when the motor is laid in a reclining position and hold the gasoline tank 18 as well as the engine 12 from contact with such surface. Wearing shoes or pads 21 may be formed on the port and starboard side of the flange 20 to give added strength and useful life.

To hold the flange 20 rigidly in the relative position heretofore described, the frame 16 has bosses 22 having lower faces adapted to rest on boss-receiving portions on the top of the crank case 13 and the cylinder block 14, respectively. These bosses 22 are positioned interiorly of the flange 20 and are integrally connected therewith by web-like extensions. Screws 23 pass downwardly through apertures in the bosses 22 and threadably engage with tapped holes in the crank case and cylinder block portions to secure the bosses. Hence the frame 16 and flange 20 are rigidly secured in fixed position with respect to the motor 12. It has been found that four of such bosses arranged so that two of them overlie the crank case and two of them overlie the cylinder block are sufficient to make and retain a rigid connection and to support the flange 20 at sufficient points around its periphery to provide rigidity and strength.

In order to provide a mounting for the tank 18, additional sets of bosses 24 are formed in the frame 16. The upper surface of these bosses is provided with a downward recess adapted to receive supporting legs 25 projecting from the bottom of the tank 18. These supporting legs 25 are drilled and tapped and receive screws 26 passing upwardly through apertures in the bosses 24. The legs being thusly positioned in the recesses in the bosses, the position of the tank 18 on the frame 16 is determined. The legs 25 are sufficiently long to maintain the bottom of the tank 18 slightly spaced from the top of the flange 20. As was the case with the bosses 22, the bosses 24 are also secured to the frame 16 interiorly of the flange 20 and integrally connected therewith by web-like extensions. It has been found that four of such bosses arranged as shown in Figures 3 and 6 are sufficient to provide rigid support for the tank.

The frame 16 is also provided with a steering lever clamp 27. This clamp is also positioned interiorly of the flange 20 and projects below its bottom edge to freely receive a steering lever 28. The clamp 27 is split as is shown in Figure 8 and has its free ends provided with holes to receive a threaded thumb screw (not disclosed) by which the halves of the clamp 27 may be drawn tightly together to secure the steering lever 28 in place. The clamp 27 is held in this position by web-like portions integral with the flange 20. As is shown in Figure 6, the longitudinal axis of the opening of the clamp 27 is positioned at an angle to the longitudinal axis of the frame 16 so that the handle end of the steering lever will be directed to one side of the outboard motor. Thus there is provided a simple and effective means of applying the force from the steering lever to the engine 12 and supporting leg 10 to effectuate steering action.

In Figures 3 and 11 there is shown another boss 29 which is carried by the flange 20 on an integral supporting web. The boss 29 is spaced from the inner face of flange 20 to provide a groove 30 adapted to receive the electrical conduit 51 connecting the spark plug to the magneto. The top surface of the boss 29 is flat, and a drilled and tapped hole extends therethrough. A flat plate (not shown) may be secured to the upper surface of the boss 27 by a screw to hold the conduit in the groove 30. The conduit is thus held within the protective confines of the flange 21.

The frame 16 as just described is suitable for use with a water cooled engine. When the frame 16 is used with an air cooled motor such as shown in the present embodiment, the interior of the frame is provided with a plate-like web 31 which extends from side to side of the flange 20 through the major portion thereof. The web 31 has a circular opening 32 in axial alinement with the crank shaft. This opening is sufficiently large to readily admit the crank shaft and the circular portion of the upper end of the crank case 13. To the stern of the circular opening 32, the web 31 is provided with a rectangular shaped opening 33 which is positioned over the cylinder 14 in the assembled position. The stern edge of the web 31 has a wall 34 projecting upwardly therefrom to the top level of the flange 20. Along the port edge of the opening 33 and extending from such edge to the port side of the flange 20 is another wall 35, also having a height similar to wall 34. At the bow of the frame 16 the web 31 is also formed upwardly to provide a wall 36 which extends to the top edge of the notched portion 37 of the flange 20. The notch 37 accommodates the engine control lever 38 and permits it to have limited rotative angular movement about the axis of the crank shaft. The gasoline tank 18 has an interior wall indicated at 38 which surrounds the flywheel combination 17 and forms a fan housing or cowl. The web 31 as just described cooperates with the cowl to complete a fan housing which directs a stream of cooling air to the cylinder 14.

In constructing the frame 16, aluminum castings have been found satisfactory, although other metals may do as well. In the frame for the air cooled engine, it is preferable to make the web-like extensions joining the bosses 22 and 24, the clamp 27, and the boss 29 to the flange 20, integral with the web 31. A supporting bridge 39, extending from side to side of the flange 20 from the bottom of web 31 may be used to strengthen the web at the narrow portion between openings 32 and 33. It is necessary to provide a small slot 40 in the web 31 to accommodate the bell crank of the control mechanism. Likewise a semi-circular depressed portion 41 at the bow of the opening 31 provides operating space for the magnetic control lever and its fastening means.

It is contemplated that in some circumstances the peripheral flange 20 need not be employed.

In such cases the frame 16 with the bosses 22, and 24, steering lever clamp 27, conduit carrying groove 30, and web 31 for cooling air cowl may still function for the purposes described.

Although only one embodiment of the invention is shown and described herein, it will be understood that this application is intended to cover such changes or modifications as come within the spirit of the invention or scope of the following claims.

We claim:

1. In an outboard motor, a supporting leg, an engine positioned at the upper end of said leg, said engine having a crank case and cylinder block with frame supports on the top thereof, a frame secured to said frame supports, and a gasoline tank mounted on said frame, said frame having an integral peripheral flange positioned below and spaced from said tank and projecting laterally beyond the sides of said tank.

2. In an outboard motor, a supporting leg, an engine positioned at the upper end of said leg, said engine having a crank case and cylinder block with frame supports on the top thereof, a frame secured to said frame supports, and a gasoline tank mounted on said frame, said frame having an integral peripheral flange positioned below and spaced from said tank and projecting laterally beyond the sides of said tank, said frame being provided with a steering lever clamp projecting below the bottom edge of said flange and adapted to receive and secure a steering lever.

3. In an outboard motor, a supporting leg, an engine positioned at the upper end of said leg, said engine having a crank case and cylinder block with frame supports on the top thereof, a frame secured to said frame supports, and a gasoline tank mounted on said frame, said frame having an integral peripheral flange positioned below and spaced from said tank and projecting laterally beyond the sides of said tank, said frame interiorly of said flange having a conduit receiving groove.

4. In an outboard motor, a supporting leg, an engine positioned at the upper end of said leg, said engine having a crank case and cylinder block with frame supports on the top thereof, a frame secured to said frame supports, and a gasoline tank mounted on said frame, said frame having an integral peripheral flange positioned below and spaced from said tank and projecting laterally beyond the sides of said tank, said frame being provided with a steering lever clamp projecting below the bottom edge of said flange and adapted to receive and secure a steering lever, said frame interiorly of said flange having a conduit receiving groove.

5. In an outboard motor, an air cooled engine including a fan incorporated with the fly wheel of said engine, said engine having a crank case and cylinder block with frame supports on the top thereof, a gasoline tank positioned on said engine and provided with an interior portion forming a part of a fan housing for said fan, and a frame positioned between said engine and tank and having an integral peripheral supporting flange projecting laterally from the sides of said tank, said frame having a web forming one wall of the fan housing, said web being provided with an outlet opening for directing air to said engine, said web being provided with portions engaging and secured to said frame supports, said web having other portions formed integral therewith and receiving and supporting said gasoline tank.

6. In an outboard motor, an air cooled engine including a fan incorporated with the flywheel of said engine, said engine having a crank case and cylinder block with frame supports on the top thereof, a gasoline tank positioned over said engine and provided with an interior portion forming part of a fan housing for said fan, said tank having supporting legs, and a frame positioned between said engine and tank and having an integral peripheral supporting flange projecting laterally from the sides of said tank, said frame having a web forming one wall of the fan housing, said web being provided with an outlet opening for directing air to said engine, said web being provided with portions engaging and secured to said frame supports, said web having other portions formed integral therewith and receiving and supporting said legs, said web having projecting from the bottom thereof below the edge of said flange a steering lever receiving clamp adapted to releasably hold a steering lever.

7. In an outboard motor, a supporting leg, an engine positioned at the top of said leg having the axis of its crank shaft parallel to the axis of said leg, said engine having a crank case and cylinder block with frame supports on the top thereof, a frame having downwardly facing bosses resting upon said frame supports and releasably secured thereto, said frame having upwardly opening recesses, a gasoline tank having its bottom portion provided with downwardly projecting supporting legs, said legs being positioned in said recesses to position said tank on said frame, and releasable means for securing said legs in said recesses, said frame having an integral peripheral flange the outline of which is similar to that of said tank, said flange being positioned below and spaced from the bottom of said tank and having portions projecting laterally beyond the sides of said tank.

8. In an outboard motor, a supporting leg, an engine positioned at the top of said leg having the axis of its crank shaft parallel to the axis of said leg, said engine having a crank case and cylinder block with frame supports on the top thereof, a frame having downwardly facing bosses resting upon said frame supports and releasably secured thereto, said frame having upwardly opening recesses, a gasoline tank having its bottom portion provided with downwardly projecting supporting legs, said legs being positioned in said recesses to position said tank on said frame, and releasable means for securing said legs in said recesses.

ROBERT G. KRUEGER.
WILLIAM F. KRUKE.

REFERENCES CITED

The following references are of record in the file of this patent:

UNITED STATES PATENTS

| Number | Name | Date |
| --- | --- | --- |
| 1,261,346 | Bivert | Apr. 2, 1918 |
| 2,224,900 | Conover | Dec. 17, 1940 |
| 2,232,160 | Blu et al. | Feb. 18, 1941 |
| 2,256,831 | Karey | Sept. 23, 1941 |
| 2,346,148 | Bosma | Apr. 11, 1944 |